United States Patent
Griffin et al.

(10) Patent No.: US 10,140,283 B2
(45) Date of Patent: Nov. 27, 2018

(54) PREDICTIVE TEXT DICTIONARY POPULATION

(75) Inventors: Jason Griffin, Kitchener (CA); Frank M Tyneski, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 1222 days.

(21) Appl. No.: 13/341,029

(22) Filed: Dec. 30, 2011

(65) Prior Publication Data

US 2012/0101811 A1    Apr. 26, 2012

Related U.S. Application Data

(63) Continuation of application No. 11/080,444, filed on Mar. 16, 2005, now Pat. No. 8,112,708, which is a continuation of application No. 10/870,035, filed on Jun. 18, 2004.

(51) Int. Cl.
G06F 17/21     (2006.01)
G06F 17/27     (2006.01)

(52) U.S. Cl.
CPC .................. *G06F 17/2735* (2013.01)

(58) Field of Classification Search
CPC .. G06F 17/2735; G06F 17/276; G06F 3/0237; G06F 17/30345; G06F 17/30578; G06F 17/30581
See application file for complete search history.

(56) References Cited

U.S. PATENT DOCUMENTS

| | | | |
|---|---|---|---|
| 5,875,443 A | 2/1999 | Nielsen | |
| 5,898,836 A | 4/1999 | Freivald et al. | |
| 6,061,686 A * | 5/2000 | Gauvin | H04L 29/06 707/624 |
| 6,141,664 A * | 10/2000 | Boothby | G06F 17/30348 |
| 6,282,508 B1 * | 8/2001 | Kimura et al. | 704/10 |
| 6,298,228 B1 * | 10/2001 | Singh | H04L 29/06 455/403 |
| 6,505,214 B1 * | 1/2003 | Sherman et al. | |
| 6,785,869 B1 * | 8/2004 | Berstis | 715/210 |
| 6,968,179 B1 * | 11/2005 | De Vries | 455/414.1 |
| 2002/0095621 A1 | 7/2002 | Lawton | |
| 2002/0126097 A1 | 9/2002 | Savolainen | |
| 2002/0143655 A1 | 10/2002 | Elston et al. | |
| 2003/0038735 A1 | 2/2003 | Blumberg | |
| 2003/0104839 A1 | 6/2003 | Kraft et al. | |
| 2003/0119561 A1 | 6/2003 | Hatch et al. | |

(Continued)

OTHER PUBLICATIONS

Office Action, dated Jan. 23, 2009, issued in Canadian Application No. 2,510,217 (3 pages).

(Continued)

*Primary Examiner* — Wilson Tsui
(74) *Attorney, Agent, or Firm* — Fish & Richardson P.C.

(57) ABSTRACT

A method and system for populating a predictive text dictionary is provided. A connection between a handheld electronic device and a network is detected. The handheld electronic device is operable to allow a user to enter text. The handheld electronic device has a predictive text dictionary that is operable to receive and employ sets of words. User preferences for the handheld electronic device are retrieved. The predictive text dictionary of the handheld electronic device is populated with a set of words at least partially based on the user preferences.

15 Claims, 5 Drawing Sheets

(56) References Cited

U.S. PATENT DOCUMENTS

| | | |
|---|---|---|
| 2004/0030540 A1 | 2/2004 | Ovil et al. |
| 2004/0030543 A1* | 2/2004 | Kida et al. ................. 704/8 |
| 2004/0043758 A1 | 3/2004 | Sorvari et al. |
| 2004/0102197 A1 | 5/2004 | Dietz |
| 2004/0148381 A1* | 7/2004 | Beppu et al. ............. 709/223 |
| 2004/0203900 A1 | 10/2004 | Cedervall et al. |
| 2004/0210435 A1* | 10/2004 | Oshima ..................... 704/10 |
| 2004/0252051 A1* | 12/2004 | Johnson ................. 342/357.09 |

OTHER PUBLICATIONS

European Search Report issued in European Application No. 04102889.5 dated Apr. 18, 2005 (3 pages).
Office Action issued in European Application No. 04102889.5 dated Oct. 6, 2006 (3 pages).
Office Action issued in European Application No. 04102889.5 dated Jun. 20, 2007 (6 pages).
Summons issued in European Application No. 04102889.5 dated Feb. 7, 2008 (5 pages).
Anonymous: "T9 Dictionaries for Subcultures" halfbakery.com, Oct. 14, 2003, p. 1, XP002323373.
Cutler, J. et al., "Location and user Dependent Information Delivery," Stanford University, Aug. 3, 2001, pp. 1-9, XP002323372, CA, USA.

\* cited by examiner

PREDICTIVE TEXT DICTIONARY POPULATION

This application is a continuation application of co-pending U.S. application Ser. No. 11/080,444, filed on Mar. 16, 2005, which is a continuation application of U.S. application Ser. No. 10/870,035 filed on Jun. 18, 2004; both applications are incorporated herein by reference.

FIELD OF THE INVENTION

The invention relates generally to computing device input interfaces and, more specifically, relates to a method and system for facilitating text entry.

BACKGROUND OF THE INVENTION

Text entry methods and systems for computing devices are well-known in the art. While some computing devices, such as personal computers, have been afforded with a full QWERTY keyboard for alphanumeric text entry, many other computing devices, such as handheld electronic devices, are equipped with limited keyboards, wherein one key can represent more than one alphabetic character. One such system, referred to in the art as multi-tap, has been in use for a number of years for permitting users to enter text using a conventional telephone key pad such as specified under ITU E 1.161. Multi-tap requires a user to press a key a varying number of times, generally within a limited period of time, to input a specific letter.

Another system, T9® developed by Tegic Communications, Inc., uses predictive letter patterns to allow a user to ideally press each key representing a letter only once to enter text. Unlike multi-tap, which requires a user to indicate a desired character by a precise number of presses of a key, or keystrokes, T9 uses a predictive text dictionary and established letter patterns for a language to intelligently guess which one of many characters represented by a key a user intended to enter. The predictive text dictionary is primarily a list of words, acronyms, abbreviations, etc. that can be used in the composition of text. Generally, all possible character string permutations represented by a number of keystrokes entered by a user are compared to the words in the predictive text dictionary and a subset of the permutations is shown to the user to allow selection of the intended character string. The permutations are generally sorted by likelihood determined from the number of words matched in the predictive text dictionary and various metrics maintained for these words. Where the possible character string permutations do not match any words in the predictive text dictionary, the set of established letter patterns for a selected language can be applied to suggest the most likely character string permutations. As can be conceived, a user may be required to input a number of additional keystrokes in order to enter in a desired word.

Despite the plethora of these and other interfaces available for inputting text on such computing devices, the ease and speed of text entry may not be satisfactory in some circumstances. The predictive text dictionary may be populated with words unlikely to be used by a user and may not contain other words more likely to be used by that user. As a result, the user may, upon entry of a set of keystrokes, be presented with a list of character strings that correspond to words that the user does not intend to input. Further, character strings corresponding to wards the user intends to input may not appear in the suggestions provided by the device.

Such predictive text dictionaries have been used on personal computers and, more recently, on computing devices with limited keyboards, to suggest a number of words to the user upon partial entry of the word. On a personal computer, the word fragment entered by a user in a software application is compared to words in a predictive text dictionary to determine a list of words matching the pattern of letters provided by the word fragment. The list of words is then provided to the user as a list of options from which the user can select. Where the word being entered by the user does not appear in the list of words displayed, the user can elect to continue entering in text to complete the word. In computing devices with limited keyboards using systems where one keystroke can represent a number of characters, such as T9, this function is little different than the determination of the character strings to show the user, as, in this case, whole words beginning with characters possibly represented by the keystrokes entered are shown to the user.

The provisioning of predictive text dictionaries on some computing devices with limited non-volatile memory has proven to be a challenge. As a result, manufacturers have been forced to equip such devices with a pared-down predictive text dictionary, thus reducing the words available. On the other hand, large, generic predictive text dictionaries can be disadvantageous as a large number of words, many of which may not be relevant to or used by the user, can be suggested by the predictive text dictionary upon entering in a number of keystrokes. This situation serves to frustrate and slow down the users input of text, and even can result in the insertion of the incorrect words.

Some computing devices permit a user to populate the predictive text dictionary with words provided by the user, thus increasing the utility of the predictive text dictionary if placed therein. This method of expanding the predictive text dictionary, however, is slow and typically needs to be repeated for each device of the user.

It is, therefore, an object of the invention to provide a novel method and system for populating a predictive text dictionary.

SUMMARY OF THE INVENTION

By populating a predictive text dictionary of a computing device based on user preferences, the predictive text dictionary can be populated with words that are relevant to the interests, needs, location, etc. of the user. In this manner, the words suggested to the user using the predictive text dictionary may be more likely to match a user's intended input.

Further, by not placing words that bear little relevance to the user in the dictionary, the suggestions provided to the user from the predictive text dictionary are likely to be more relevant to the user's intended input.

The maintenance of sets of words related to various interests, professions, locations, etc. allows a predictive text dictionary to be quickly populated with words relevant to the user. Also, where a user maintains more than one such computing device, or replaces one computing device with another, the invention provides a simple method of populating the predictive text dictionary of the new computing device(s) that does not require the user to spend an undue amount of time entering the words into the dictionary himself.

By maintaining a database of words related to various interests, professions, locations, etc., and using the words in the database to populate the predictive text dictionary of a users computing device, words can be prospectively placed into the dictionary for later use by the user.

BRIEF DESCRIPTION OF THE DRAWINGS

Certain embodiments of the invention will now be described, by way of example only, with reference to the attached Figures, wherein.

DETAILED DESCRIPTION OF THE INVENTION

Figure 1:
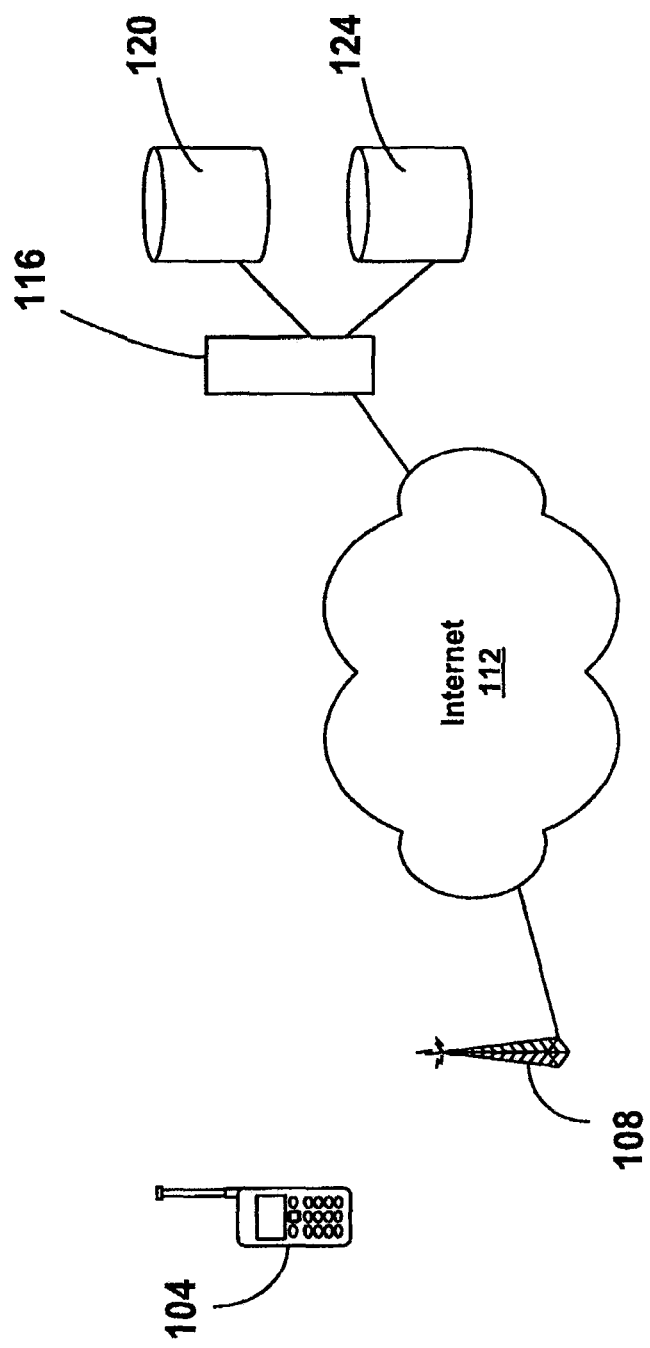
FIG. 1 shows a topological view of a number of components of the invention.

FIG. 1 is a schematic diagram of a number of components in accordance with an embodiment of the invention. A mobile computing device 104 is shown in communication via radio frequency to a cell tower 108, which is, in turn, connected to the Internet 112 via some wireless network infrastructure (not shown). A server 116 is also connected to the Internet 112, and is additionally coupled to a word database 120 and a user database 124.

The word database 120 stores a plurality of words that correspond to a number of categories and/or locations, and a number of other metrics corresponding to each word. A word as used herein refers to a word, an acronym, an abbreviation, a phrase, etc. employed by users to communicate. For example, the words "football", "NFL", "Superbowl", "touchdown", "referee" and "ref" could be associated with a "Sports" category. Additionally, some words in the word database 120 are related to locations, such as cities. For example, the words "Washington", "D.C.", "President", "White House" and "Smithsonian" and "Pennsylvania Avenue" could be associated with the city of Washington, D.C.

Words can be added to or deleted from the word database 120. For example, where a user has selected the "Sports" category, the rise of a new star NFL football player could cause his name to be added to the category. In an embodiment, the player's name is added, along with the date.

The user database 124 stores user preferences for each user including the currently selected categories, the date the categories were last updated, the date that the computing device was last updated, the last detected location of the computing device, and the date since which the computing device has been at that location.

The server 116 executes a user manager that is operable to retrieve user preferences from the user database 124, a query module to retrieve words corresponding to the user preferences from the word database 120, and a communications module to communicate the retrieved words to the computing device 104.

Figure 2:
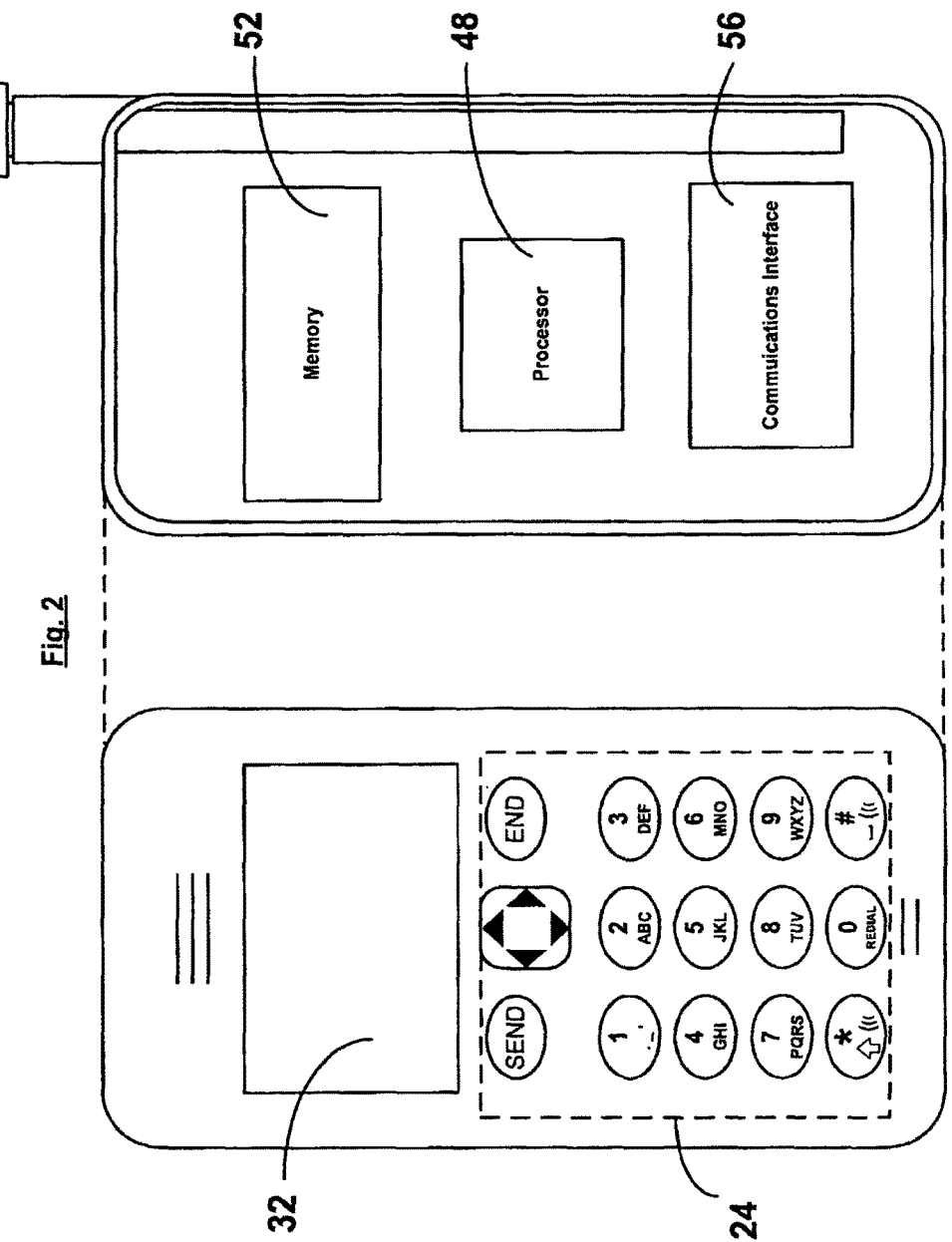
FIG. 2 shows an exploded view of a cellphone.

FIG. 2 shows an exploded view of a mobile computing device 104 having a text input interface 24, a display 32, a processor 48, memory 52 and at least one communications interface 56. The text input interface 24 comprises a set of keys via which a user can input text. The display 32 allows the user to view the inputted text and any options provided to the user. The memory 52 comprises non-volatile memory in which an operating system, applications and persistent data are stored, and volatile memory to provide adequate temporary memory registers for the applications and operating system to use during execution. The processor 48 executes the operating system and applications.

The communications interface 56 of the mobile computing device 104 is comprised of a wireless radio and antenna and is operable to communicate with the cell tower 128.

The mobile computing device 104 executes any of a number of applications, such as a Wireless Application Protocol (WAP) browser, an email application, a Short Message Service (SMS) application, a notes application, etc.

In addition, the mobile computing device 104 executes a predictive text application for receiving keystrokes from a user, determining what character strings the keystrokes can represent, and comparing the character strings to words in a predictive text dictionary maintained in non-volatile memory. The predictive text dictionary is a list of words maintained by the computing device 104. The predictive text dictionary maintains the categories and locations (if any) to which each word is associated.

Metrics can also be stored in the predictive text dictionary by the predictive text application. The metrics can correspond to the number of times each word is actively selected by the user of the computing device. Additionally or alternatively, the metrics can correspond to the number of times each word is used by the user, or is even present in a document, email, etc. received by the user. A number of non-user-specific metrics can also be stored in the predictive text dictionary, including general likelihoods used to determine priority between two words not previously used by a user. Further, a number of words in the predictive text dictionary that are intended to be permanently located in the dictionary can be marked as such using the metrics.

Figure 3:
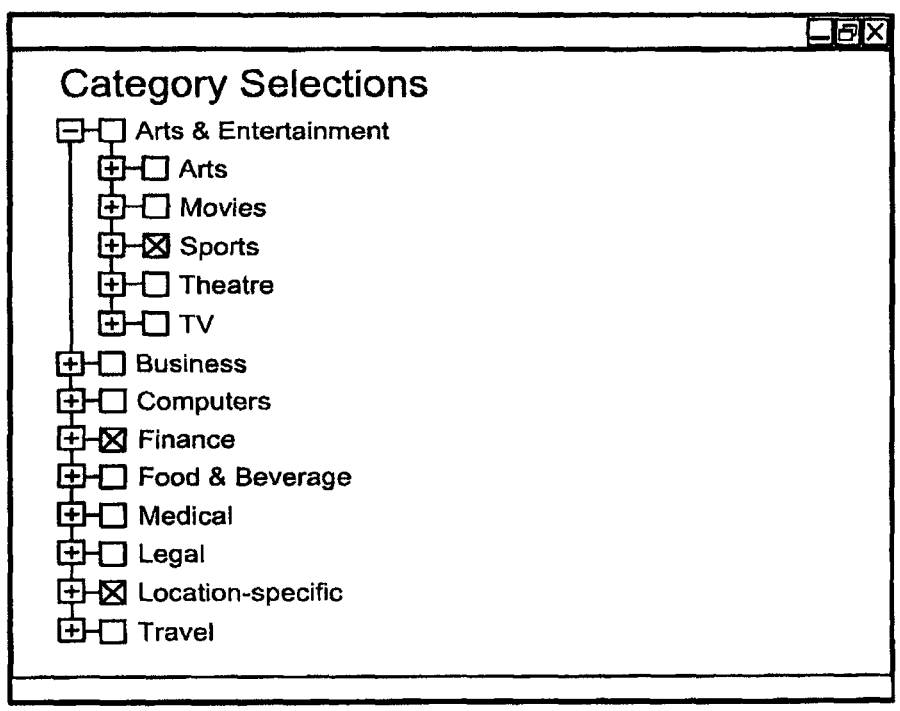
FIG. 3 shows an exemplary user interface for selecting categories and options for use in the invention.

FIG. 3 shows an exemplary user interface 80 for allowing a user to select which categories are relevant to the user. The user interface 80 can be provided via a web page, a client application or the like. In order to change preferences, the user launches the user interface 80 and selects or deselects the categories he deems as relevant. The "Sports", "Finance" and "Location-specific" categories are shown as being selected.

Figure 4:
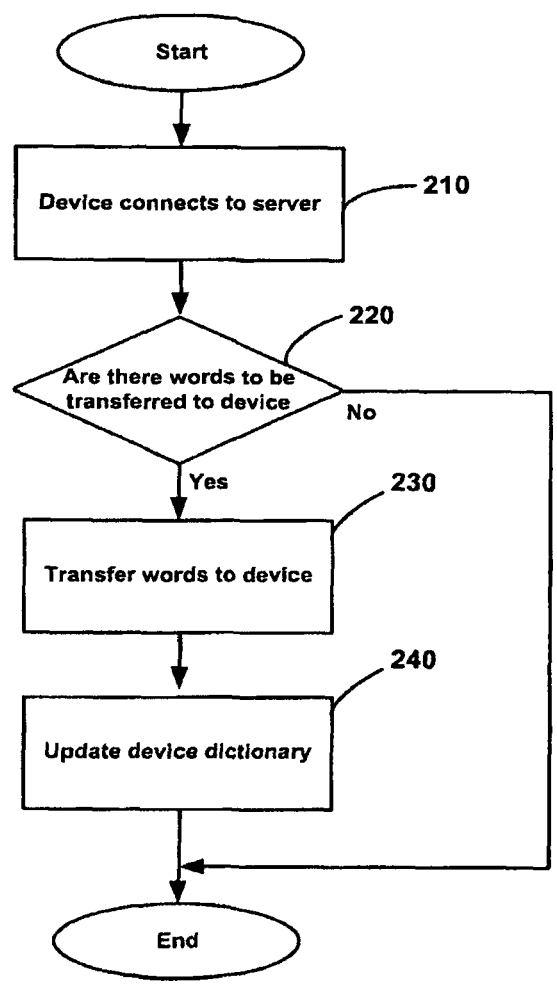
FIG. 4 illustrates a method of updating a computing device's predictive text dictionary.

The general updating of the predictive text dictionary on the computing device 104 is shown in FIG. 4. In an embodiment, this process occurs once per day and every time the device or its communication interface 56 is turned on. If the communication interface 56 of computing device 104 was turned off and is then turned on, such as is done when a user of the computing device boards and disembarks from an airplane, the device 104 registers itself with the cell tower 108. At step 210, upon registration with the cell tower 108, the computing device 104 makes a request to the server 116 for any words to be received. The request is sent to the cell tower 108, which, in turn, forwards the request to the server 116 over the Internet 112. The request received by the server 116 includes information regarding the identity of the computing device 104 and the location of the cell tower 108.

At step 220, the server 116 determines if there are words to be transferred to the computing device 104. The user manager executing on the server 116 retrieves the user preferences from the user database 124 and determines what queries will need to be run on the word database 120.

Figure 5:
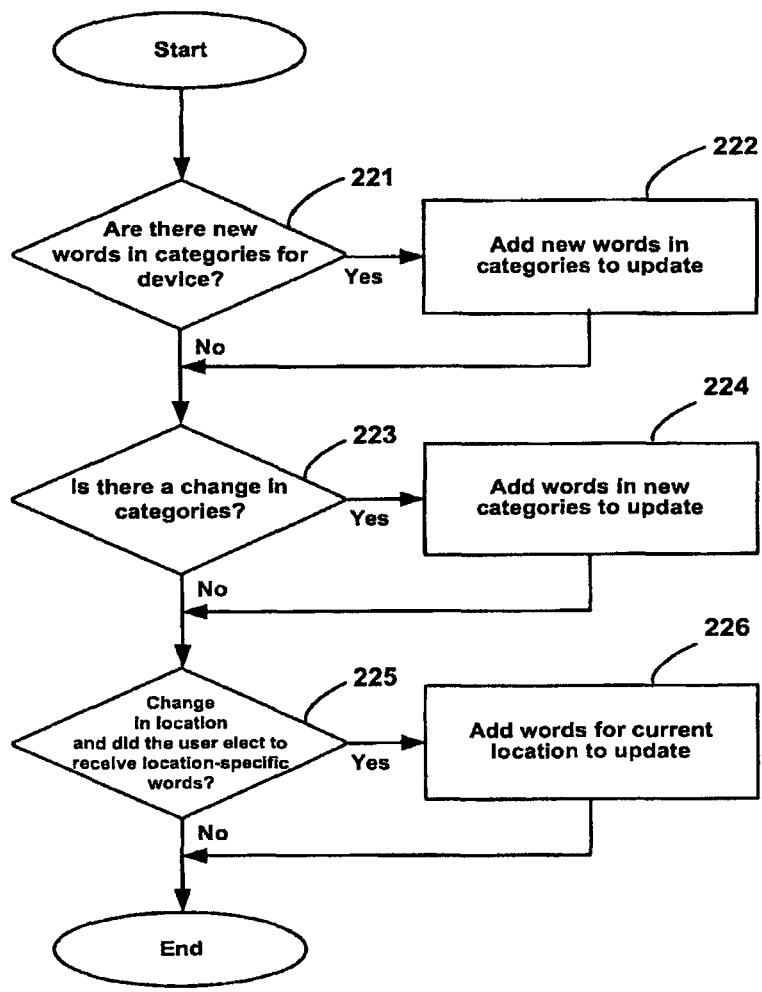
FIG. 5 illustrates a method of creating an update for a computing device's predictive text dictionary.

FIG. 5 shows the method of determining if there are words to be transferred to the computing device 104. At step 221, it is determined whether there are any new words in the word database 120 corresponding to the existing categories a user has selected. For example, where a user has selected the "Sports" category, and the addition of a new NFL football player's name to the word database occurred after the computing device's last update, the player's name could be flagged for transfer to the device at step 222.

At step 223, it is determined whether the user has selected new categories. At step 224, the words corresponding to the new categories are added to the list of words to be transferred to the computing device 104. Then, at step 225, it is determined whether the computing device is in a new location and whether the user preferences indicate that the user selected to receive location-specific words. If the answer to both questions is yes, the words associated with the new location in the word database 120 are added to the list of words to be transferred to the computing device 104 at step 226.

While the flow chart of FIG. 5 shows three distinct groups of words being determined, those of skill in the art will appreciate that there may be overlap between the three groups and that the determination of the words to be transferred can typically be performed with a single query. The single query is formulated by the query module of the server 116 and made of the word database 120. The word database 120, in turn, returns a set of words that correspond to at least one of the three steps 231, 233 and 235 above.

Returning to FIG. 4, the method proceeds to step 230, where the list of words is transferred to the computing device 104 by the server 116. In the implementation being described, the words are transferred via a proprietary protocol. Upon receipt of the words, the device updates the predictive text dictionary by appending the words to the dictionary. The method of updating the computing device is then complete.

It can be desirable to remove words from the predictive text dictionary of the computing device 104 for a number of reasons. Where the computing device may have limited memory, words can be removed from the predictive text dictionary by examining the metrics associated with each word and discarding those words with the lowest values determined by a function of those metrics. The predictive text dictionary may also be pared-down by the user or system operator in recognition that over-population of the dictionary with words that are not likely to be used can lead to poor suggestions being provided to the user upon entering a number of keystrokes. In the current implementation, this is performed in two ways.

When a user selects to remove a category from his user preferences via the user interface 80, the server 116 can transmit this information to the computing device 104. In response, the computing device can purge some or all of the words associated only with the removed category. Where a word in the predictive text dictionary associated with the category to be removed has been used by the user according to the metrics maintained by the dictionary, the word can be left in the dictionary.

Further, when a user has selected to receive location-specific words, and has brought the computing device 104 to a new location, the server can direct the computing device to purge all of the words associated with a prior location from the predictive text dictionary. Where a word in the predictive text dictionary associated with the previous location to be removed has been used by the user according to the metrics maintained by the dictionary, the word can be left in the dictionary.

While the invention has been described with specificity to mobile devices, other types of computing devices with which the invention can be used will occur to those of skill in the art. For example, a personal computer can benefit from the invention, as the predictive text dictionary of an application executing thereon could be populated with words relevant to the interests, profession, etc. of the user of the personal computer to provide for enhanced word completion capabilities. Further, where the computing device is a wireless device that occasionally connects to a networked computer via a cable or other local networking means such as WiFi or Bluetooth, the invention can benefit from reduced rates for data communications via landline by connecting to the server at least partially exclusively through the networked computer.

While the illustrated embodiment discusses the use of user options, these user options may be implicit or provided in some other manner. For example, upon subscribing to a wireless access service, a user may be asked if he would like to receive location-specific information. The computing device he receives can be preconfigured to always receive location-specific words upon detection that he is in a different location.

The user can be provided the option of updating the predictive text dictionary for a location to which the computing device has yet to go. This can be advantageous where a user is preparing for a business trip.

Words in the word database can be selected to correspond to a specific category and location at the same time. As a result, the predictive text dictionary of a computing device may only be updated with the appropriate words when a user of the device selected the appropriate category and is in the specific location.

The server can be a cluster of servers in a single location or can be two or more servers situated in a number of locations.

Where a computing device is memory-restricted, the server can selectively forward words to the computing device. Also, the computing device can delete a group of words from the predictive text dictionary to allow for newer words. Also, the words can be forwarded to the computing device via other means of communication apart from a proprietary protocol, such as email, MMS, WAP push and the like.

While the location of the computing device is determined by determining which cell tower the computing device is connected through, other methods of locating the computing device known to those skilled in the art can be used. For example, the computing device can, in some circumstances, be located by determining the node on the Internet closest to the cell tower, generally associated with a wireless gateway for the cellular service provider. Cellular triangulation can also be used. Further, if the computing device is equipped with a GPS receiver, the device can communicate the GPS-received location along with the request for new words.

The words provided to the computing device for population of its predictive text dictionary can be set to expire after a period of time and/or period of non-use. This could be advantageous with current event items. In such a case, the server can selectively retransmit a word previously transmitted to a computing device if it is believed the word will be used again. Additionally, location-specific words could be set to expire upon relocation of the computing device.

The user database can alternatively reside either on the computing device and be transmitted to the server when requesting updates or can reside on a computer associated with the computing device.

Additionally, the words can be provided to the computing device by other means. For example, the words can be placed on a subscriber identity module ("SIM") card which are incorporated in the predictive text dictionary upon insertion of the SIM card and initialization of the computing device or predictive text application thereon. Other methods will occur to those skilled in the art.

The above-described embodiments of the invention are intended to be examples of the invention and alterations and modifications may be effected thereto, by those of skill in the art, without departing from the scope of the invention which is defined solely by the claims appended hereto.

What is claimed is:

1. A method of populating a predictive text dictionary of a computing device, the method comprising:
   receiving a selection of one or more word categories, wherein the one or more word categories include a plurality of words, each of the plurality of words is associated with a date when the word was added to the one or more word categories, one of the one or more word categories is a location-specific category, and each word in the location-specific category is associated with a location;
   in response to receiving the selection, updating a user preference to include the selected one or more word categories, wherein the user preference includes a date when a last previous update occurred for the predictive text dictionary of the computing device;
   sending a request, from the computing device to a server through a communication network, for a new word, wherein the server determines that a location of the computing device is different than a previous location of the computing device, and the new word is selected at least partially based on the date when the last previous update occurred for the predictive text dictionary of the computing device prior to a date when the new word was added to the one or more word categories, and a location associated with the new word matching the location of the computing device if the new word is in the location-specific category;
   receiving, at the computing device, the new word from the server through the communication network;
   updating, by the computing device, the predictive text dictionary of the computing device to include an addition of the received new word, wherein updating the predictive text dictionary also includes discarding an existing word from the predictive text dictionary, and the existing word is associated with the previous location of the computing device;
   receiving text input at the computing device; and
   in response to receiving the text input, presenting, at the computing device, at least one predicted word that is based on the text input and the updated predictive text dictionary.

2. The method of claim 1, wherein updating the predictive text dictionary further comprises:
   determining whether to discard a second existing word from the predictive text dictionary; and
   discarding the second existing word from the predictive text dictionary.

3. The method of claim 2, wherein determining whether to discard the second existing word from the predictive text dictionary further comprises:
   receiving from the server a user preference associated with the computing device; and
   determining whether a word category is removed in the user preference.

4. The method of claim 3, wherein discarding the second existing word from the predictive text dictionary further comprises:
   discarding the second existing word associated with the removed word category.

5. The method of claim 2, wherein determining whether to discard the second existing word from the predictive text dictionary further comprises:
   determining whether to discard the second existing word based on an expiry date associated with the second existing word.

6. The method of claim 2, wherein determining whether to discard the second existing word from the predictive text dictionary further comprises:
   determining whether to discard the second existing word based on usage of the second existing word in the computing device.

7. A non-transitory, computer-readable medium having computer executable instructions stored thereon for execution on a processor of a device so as to implement the method of claim 1.

8. A computing device comprising:
   a memory storing a predictive text dictionary;
   one or more hardware processors communicatively coupled with the memory and configured to:
      receive a selection of one or more word categories, wherein the one or more word categories include a plurality of words, each of the plurality of words is associated with a date when the word was added to the one or more word categories, one of the one or more word categories is a location-specific category, and each word in the location-specific category is associated with a location;
      in response to receiving the selection, update a user preference to include the selected one or more word categories, wherein the user preference includes a date when a last previous update occurred for the predictive text dictionary of the computing device;
      send a request, from the computing device to a server through a communication network, for a new word, wherein the server determines that a location of the computing device is different than a previous location of the computing device, and the new word is selected at least partially based on the date when the last previous update occurred for the predictive text dictionary of the computing device prior to a date when the new word was added to the one or more word categories, and a location associated with the new word matching the location of the computing device if the new word is in the location-specific category;
      receive, at the computing device, the new word from the server through the communication network;
      update, by the computing device, the predictive text dictionary to include an addition of the received new word, wherein updating the predictive text dictionary also includes discarding an existing word from the predictive text dictionary, and the existing word is associated with the previous location of the computing device;
      receive text input at the computing device; and
      in response to receiving the text input, present, at the computing device, at least one predicted word that is based on the text input and the updated predictive text dictionary.

9. The computing device of claim 8, wherein the one or more hardware processors are further configured to:
   receive a user preference associated with the computing device from the server;

determine whether a word category is removed in the user preference; and discard a second existing word associated with the removed word category from the predictive text dictionary.

10. The computing device of claim 8, wherein the one or more hardware processors are further configure to:

determine whether to discard a second existing word from the predictive text dictionary based on an expiry date associated with the second existing word; and discard the second existing word from the predictive text dictionary.

11. The computing device of claim 8, wherein the one or more hardware processors are further configured to:

determine whether to discard a second existing word from the predictive text dictionary based on usage of the second existing word in the computing device; and discard the second existing word from the predictive text dictionary.

12. A method of populating a predictive text dictionary of a computing device, the method comprising:

receiving a selection of one or more word categories, wherein the one or more word categories include a plurality of words, each of the plurality of words is associated with a date when the word was added to the one or more word categories, one of the one or more word categories is a location-specific category, and each word in the location-specific category is associated with a location;

in response to receiving the selection, updating a user preference to include the selected one or more word categories, wherein the user preference includes a date when a last previous update occurred for the predictive text dictionary of the computing device;

sending a request, from the computing device to a server through a communication network, for a new word, the request including a location of the computing device, wherein the server determines that the location of the computing device is different than a previous location of the computing device, and the new word is selected at least partially based on the location of the computing device matching a location associated with the new word if the new word is in the location-specific category, and the date when the last previous update occurred for the predictive text dictionary of the computing device prior to a date when the new word was added to the one or more word categories;

receiving, at the computing device, the new word from the server through the communication network;

updating, by the computing device, the predictive text dictionary of the computing device to include an addition of the received new word, wherein updating the predictive text dictionary also includes discarding an existing word from the predictive text dictionary, and the existing word is associated with the previous location of the computing device;

receiving text input at the computing device; and in response to receiving the text input, presenting, at the computing device, at least one predicted word that is based on the text input and the updated predictive text dictionary.

13. The method of claim 12, wherein the computing device is a wireless handheld electronic device associated with a wireless gateway, and capable of a cellular communication with a cellular tower.

14. The method of claim 12, wherein the computing device is a wireless handheld electronic device and capable of determining the location of the computing device based on cellular triangulation.

15. The method of claim 12, wherein the computing device includes a GPS receiver, and is capable of determining a latitude and a longitude of the location of the computing device.

* * * * *